United States Patent
Wu

(10) Patent No.: US 7,604,444 B2
(45) Date of Patent: Oct. 20, 2009

(54) FASTENER ASSEMBLY

(75) Inventor: Xiaodong Wu, Nashville, TN (US)

(73) Assignee: Cooper Technologies Company, Houston, TX (US)

( * ) Notice: Subject to any disclaimer, the term of this patent is extended or adjusted under 35 U.S.C. 154(b) by 379 days.

(21) Appl. No.: 11/551,931

(22) Filed: Oct. 23, 2006

(65) Prior Publication Data
US 2008/0095591 A1    Apr. 24, 2008

(51) Int. Cl.
*F16B 27/00*    (2006.01)
(52) U.S. Cl. .................... 411/85; 411/104; 411/553
(58) Field of Classification Search ............ 411/161, 411/85, 104, 553; 248/317
See application file for complete search history.

(56) References Cited

U.S. PATENT DOCUMENTS

| | | | |
|---|---|---|---|
| 4,545,697 A * | 10/1985 | Verdenne et al. | 403/230 |
| 5,375,798 A | 12/1994 | Hungerford, Jr. | |
| 5,489,173 A | 2/1996 | Höfle | |
| 6,588,711 B2 * | 7/2003 | Onishi | 248/49 |
| 6,632,058 B2 | 10/2003 | Hoffmann | |
| 6,726,117 B2 | 4/2004 | Herb | |
| 6,733,221 B2 | 5/2004 | Linger | |
| 6,872,038 B2 * | 3/2005 | Westlake | 411/85 |
| 7,052,222 B2 * | 5/2006 | Muller et al. | 411/84 |

OTHER PUBLICATIONS

Hilti, MQN Pushbutton Galvanized Channel System, Hilti Website, 1 page.
Unistrut, Kwik Washer, Unistrut Website, 4 pages.
RapidSTRUT catalog, Flexible Railsystem for all applications, issue Jan. 2002, 4 pages, United Kingdom.

* cited by examiner

*Primary Examiner*—Gary Estremsky
(74) *Attorney, Agent, or Firm*—Senniger Powers

(57) ABSTRACT

A fastener assembly is disclosed for securing an object to channel framing. One embodiment of the assembly includes an elongate body such as a nut which engages inside faces of the framing at opposite sides of a slot in the framing, a washer spaced from the nut which engages outside faces of the framing at opposite sides of the slot, and a spring interposed between and connecting the nut and the washer for generating a force holding the washer and nut in clamping engagement with respective faces of the framing prior to securing an object to the framing.

22 Claims, 11 Drawing Sheets

US 7,604,444 B2

FASTENER ASSEMBLY

BACKGROUND OF THE INVENTION

This invention relates generally to fasteners for fastening objects to metal channel framing and, more particularly, to a fastener assembly in which an elongate body (e.g., a nut with a threaded opening), a washer and a spring are pre-assembled to reduce the time needed to assemble and install such items on framing at the job site.

Electrical conduit, pipes, fixtures, etc. are commonly supported overhead or vertically by channel framing conventionally having side flanges with inwardly turned, hook-shaped lips defining a slot extending lengthwise of the framing. Typically, an elongate nut with a threaded opening is used for securing objects to the framing, the nut first being aligned with, entered into and passed through the slot, and then turned 90 degrees to a crosswise position with the outside face of the nut engaging the inside faces of the channel lips. Various mechanisms are used for holding the nut against the channel in its crosswise position prior to and during the process of securing an object to the channel.

After the nut is positioned in the channel framing, an object is secured to the framing using a screw, bolt, or other threaded fastener which threads into the nut. A lock washer is often placed between the object being secured and the channel framing to prevent rotation of the object relative to the channel framing. This installation process, using a nut and a separate washer, by the person attaching the object to the framing is relatively labor intensive and thus expensive.

Reference may be made to U.S. Pat. Nos. 1,306,100, 3,483, 910, 4,146,074, 5,375,798, 5,489,173, 6,632,058, 6,726,117 and 6,733,221 which disclose fasteners and fastener assemblies in the field of this invention.

SUMMARY OF THE INVENTION

In general, an improved fastener assembly of this invention is useful for securing an object to a structure. In one embodiment, the fastener assembly comprises an elongate body having a first face constituting an inside face, an opposite face constituting an outside face, opposite sides, and opposite ends. The assembly also includes a washer having a first face constituting an inside face opposing and spaced from the outside face of the elongate body, and a second face constituting an outside face. An opening extends through the washer. A coil spring is interposed between the elongate body and the washer. The spring has a longitudinal axis generally aligned with the opening in the washer, a first end affixed to the elongate body, and a second end affixed to the washer. The spring urges the elongate body and the washer toward one another and permits relative movement between the elongate body and the washer generally along the spring axis.

In another embodiment, a fastener assembly of this invention comprises an elongate body having a first face constituting an inside face, an opposite face constituting an outside face, opposite sides, and opposite ends. The assembly also includes a washer having a first face constituting an inside face opposing and spaced from the outside face of the elongate body, and a second face constituting an outside face. An opening extends through the washer. A resiliently deformable element is interposed between the elongate body and the washer. The resiliently deformable element has a first end affixed to the elongate body and a second end affixed to the washer. The resiliently deformable element urges the elongate body and washer toward one another and permits relative movement between the elongate body and the washer. At least one ramp is provided on the elongate body to facilitate movement of the elongate body away from the washer during installation.

In another aspect, the invention is directed to a method of making a fastener assembly for use in securing an object to channel framing. The method comprises the steps of affixing a first end of a coil spring having a longitudinal axis to an elongate body, and affixing a second end of the coil spring to a washer having an opening therein such that the opening in the washer is generally aligned with the longitudinal axis of the spring.

Other features will be in part apparent and in part pointed out hereinafter.

BRIEF DESCRIPTION OF THE DRAWING

Corresponding reference characters indicate corresponding parts throughout the several views of the drawing.

DESCRIPTION OF A PREFERRED EMBODIMENT

Figure 1:
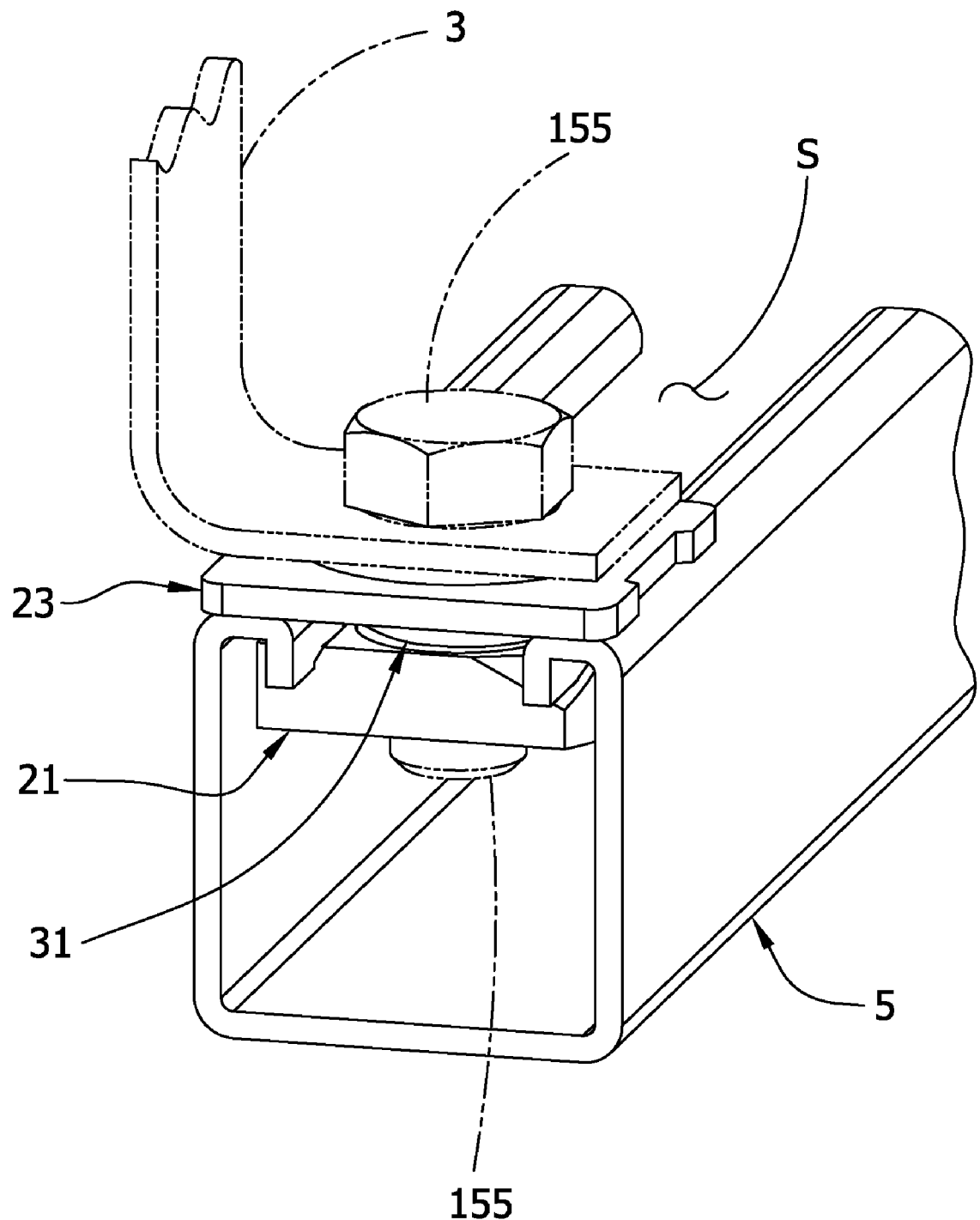
FIG. 1 is a perspective of one embodiment of a fastener assembly of this invention secured to channel framing.
Figure 2:
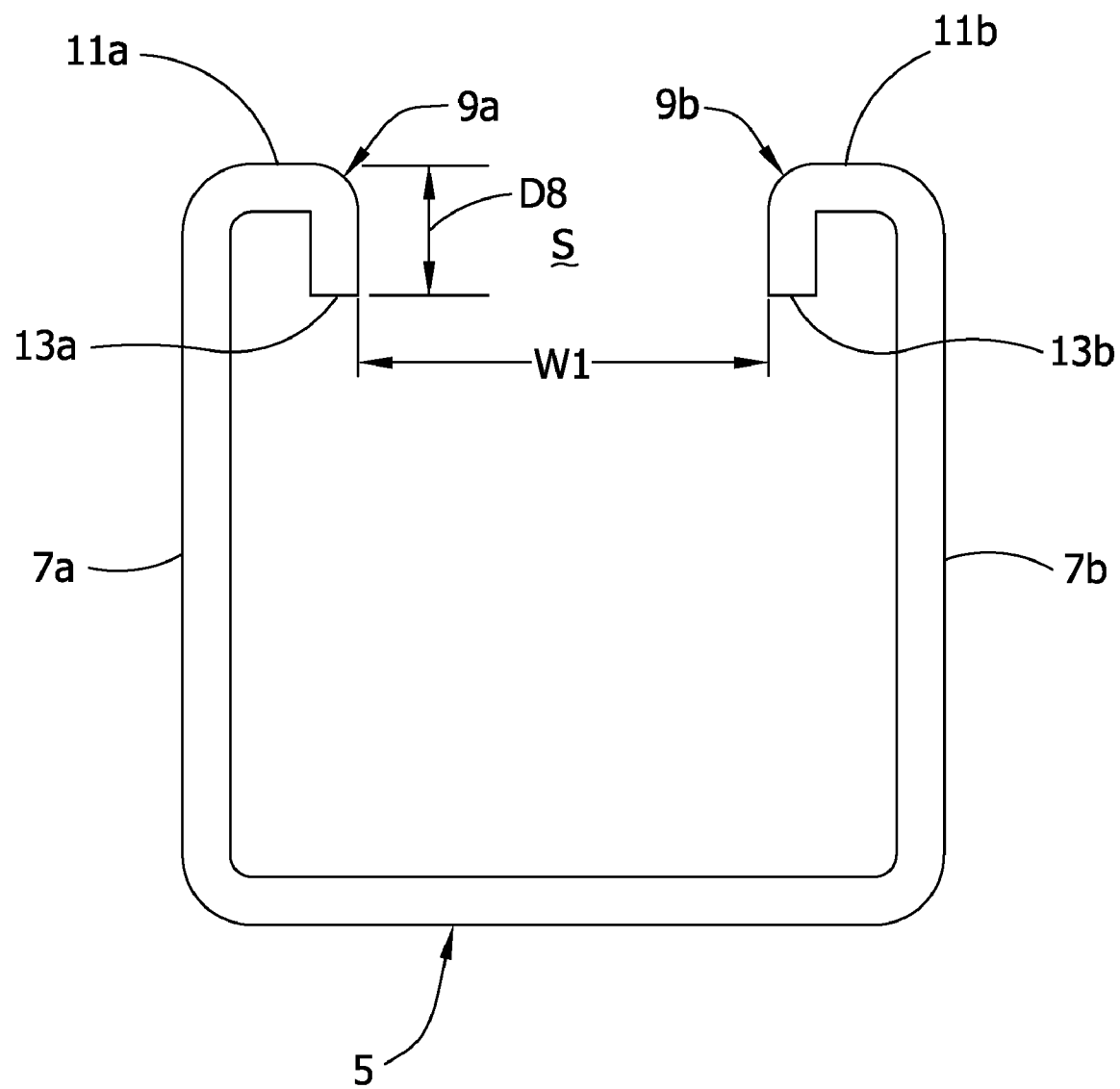
FIG. 2 is an end elevation of the channel framing of FIG. 1.

Referring now to the drawing, particularly to FIG. 1, a fastener assembly of this invention is indicated in its entirety at 1. The assembly 1 is used to secure an object 3 (such as the bracket shown in phantom in FIG. 1) to a structure such as metal framing 5 which, in one embodiment, comprises a channel-shaped support sometimes referred to as "strut." As shown in FIG. 2, the channel 5 has a pair of side flanges 7a, 7b, the outer (upper) ends of which have inwardly directed lips formed thereon as indicated generally at 9a and 9b. These lips are hook-shaped, having outside faces 11a, 11b and inside faces defined by edges 13a, 13b. The lips are spaced from one another to define a slot S which extends the length of the channel. The slot has a width W1. The framing 5 may have other shapes. Further, a fastener assembly of this invention can be used to secure an object 3 to other types of structures.

Figure 3:
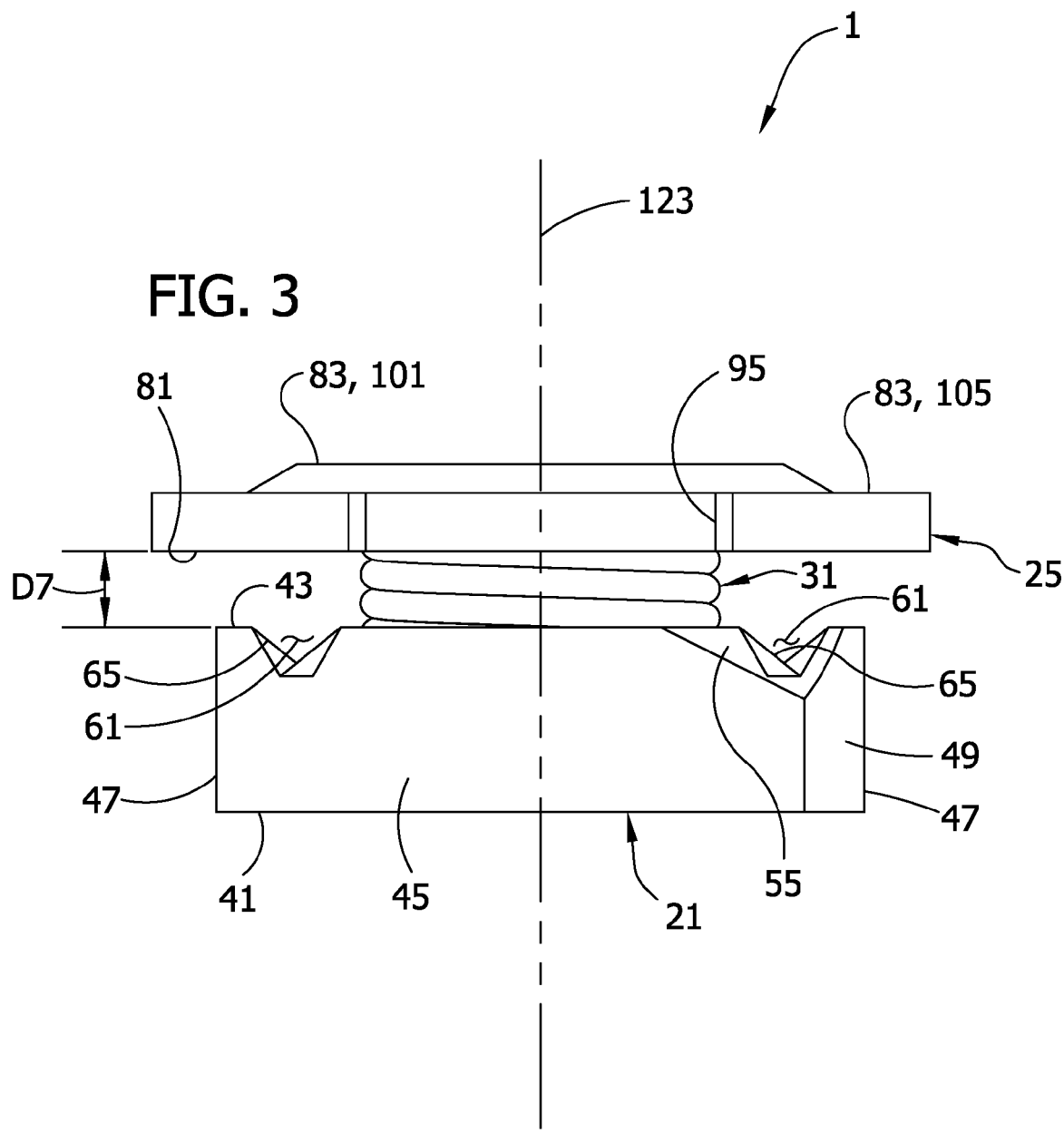
FIG. 3 is a side elevation of the fastener assembly of FIG. 1 showing it removed from the channel framing.

In general, the fastener assembly comprises three parts (see FIG. 3). The first part comprises an elongate body generally designated 21 adapted to engage the inside faces 13a, 13b of the channel lips 9a, 9b at opposite sides of the slot S. The second part of the assembly comprises a washer, generally designated 25, spaced from the body 21 and adapted to engage the outside faces 11a, 11b of the channel lips at opposite sides of the slot S. The third part of the assembly comprises a resiliently deformable element generally designated 31 interposed between and connecting the body 21 and the washer 25 for generating a force holding the washer and body in clamping engagement with respective faces of the channel lips 9a, 9b prior to securing an object to the framing 5 by means of the fastener assembly 1, as will be understood by those skilled in this field.

Figure 7:
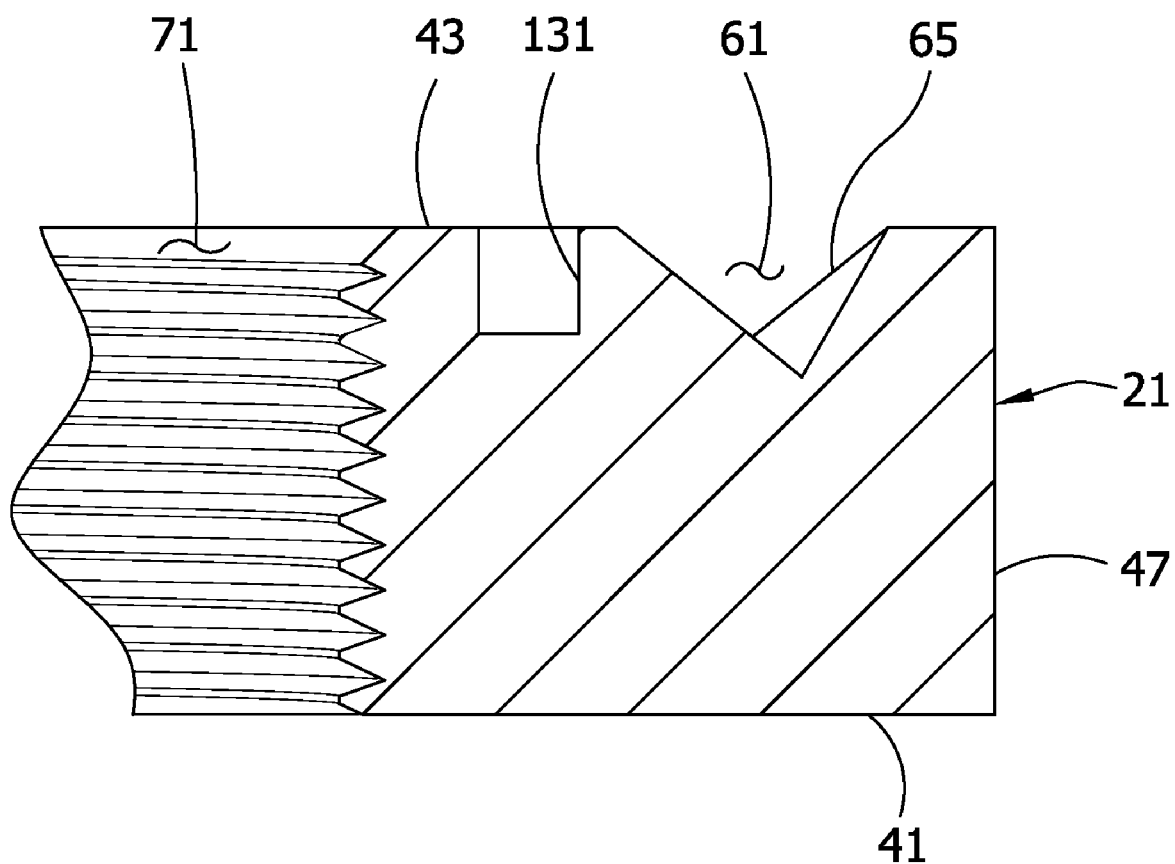
FIG. 7 is an enlarged section along line 7-7 of FIG. 6.
Figure 8:
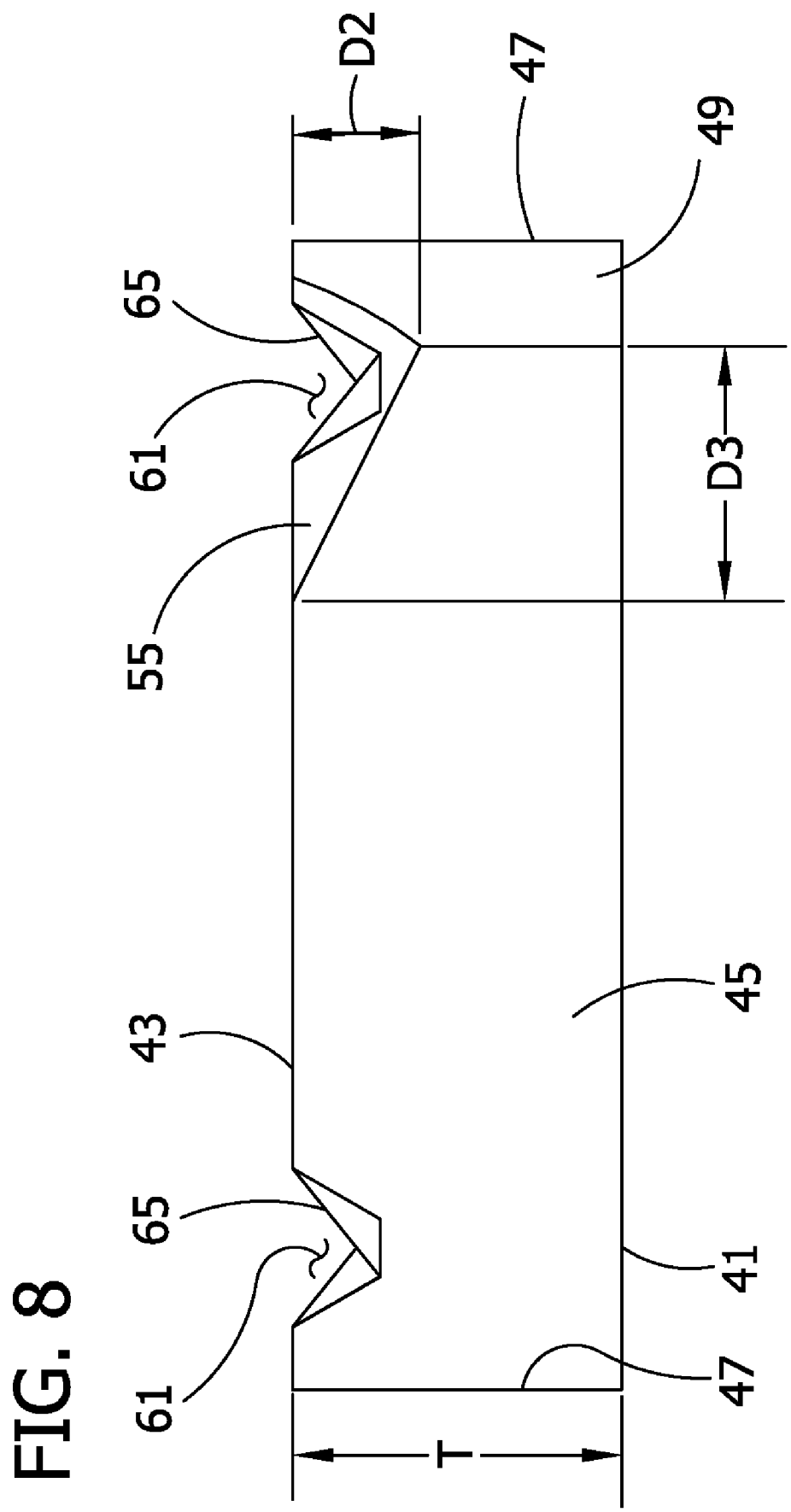
FIG. 8 is a side elevation of the elongate body shown in FIG. 6.

The elongate body 21 has an inside (lower) face 41, an outside (upper) face 43, opposite sides 45 and opposite ends 47. While the length L of body 21 (FIG. 6) is greater than the width W1 of the channel slot S (but less than the distance between channel side flanges 7a, 7b), the width W2 of the body is less than the width W1 of slot S so that the body may be inserted in and installed on the channel in a manner to be hereinafter described. Diagonally opposite first and second corners 49 of the body at opposite ends 47 of the body are rounded for facilitating such installation (see FIG. 6). The third and fourth corners 51 are preferably substantially squared off (i.e., not rounded). Further, first and second ramps 55 are provided on the outside face 41 of the body 21 adjacent the first and second corners 49 of the body to facilitate turning the body to a crosswise position relative to the slot S, as will be described in more detail later. These ramps 55 slope toward respective corners of the 49 of the body 21 and may be formed by chamfering the edge margins of the body, or in some other suitable manner. Although two ramps 55 are provided in the embodiment shown in the figures, it is contemplated that only one ramp could be used. The precise configuration and dimensions of each ramp will vary but should be such as to permit the body 21 to be readily rotated to its crosswise position. By way of example, for a body 21 having a length L of 1.31 in., a width W2 of 0.75 in, and a thickness T of 0.25 in., the relevant dimensions of each of the two ramps shown in FIGS. 6-8 may be D1=0.236 in.; D2=0.157 in.; and D3=0.315 in. Other dimensions are possible.

Figure 6:
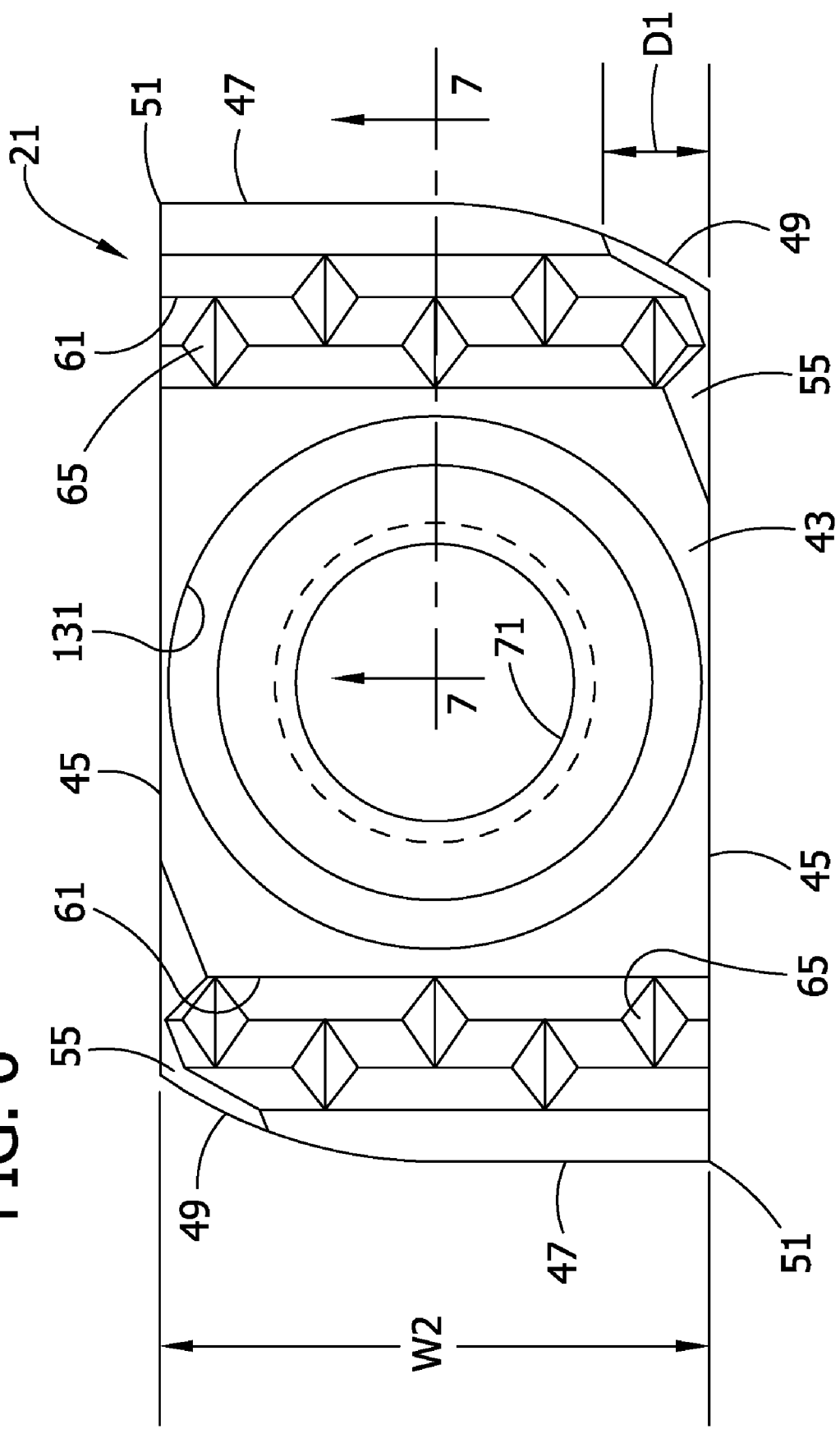
FIG. 6 is a top plan of an elongate body of the fastener assembly of FIG. 1.

As shown in FIG. 6, the outside face 43 of the elongate body 21 has a pair of grooves 61 therein generally adjacent opposite ends 47 of the body and extending widthwise of the body for receiving the edges 13a, 13b of the channel lips 9a, 9b when the body is turned to its crosswise position (FIG. 1). Teeth 65 are provided in the grooves 61 for enhancing the frictional contact between the body 21 and the channel lips. The body 21 has a central threaded opening 71 extending completely through the body from its inside face 41 to its outside face 43. In this particular embodiment of the invention, the elongate body 21 is commonly referred to as a "nut." The body may be formed by a stamping operation or other suitable operation. The body 21 is preferably formed from metal, such as a zinc-coated, heat treated, AISI 1018 steel having a Rockwell hardness of 30-50 C and more preferably 40-45 C. Other materials may be used.

Figure 5:
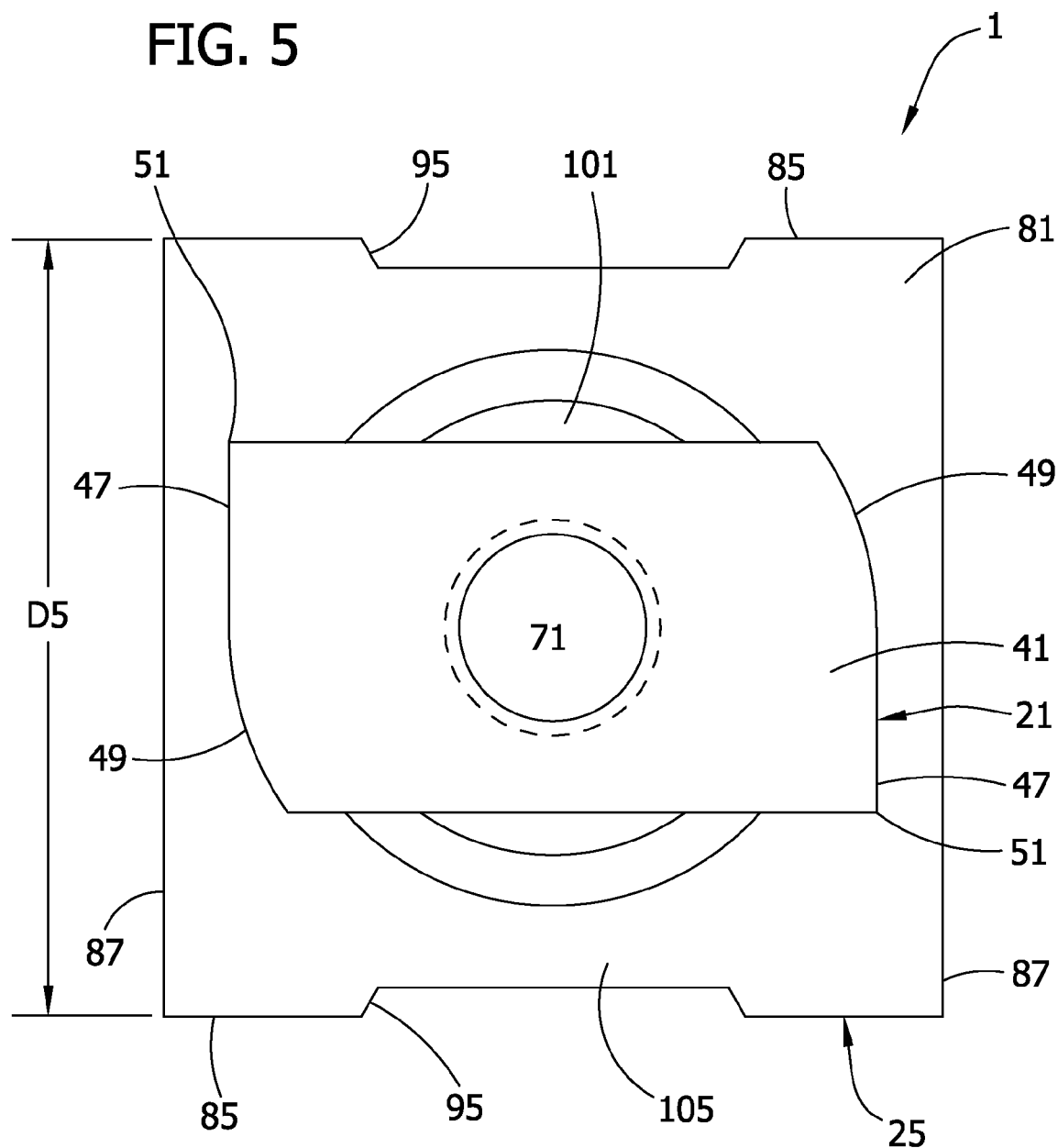
FIG. 5 is a bottom plan of the fastener shown in FIG. 3.
Figure 9:
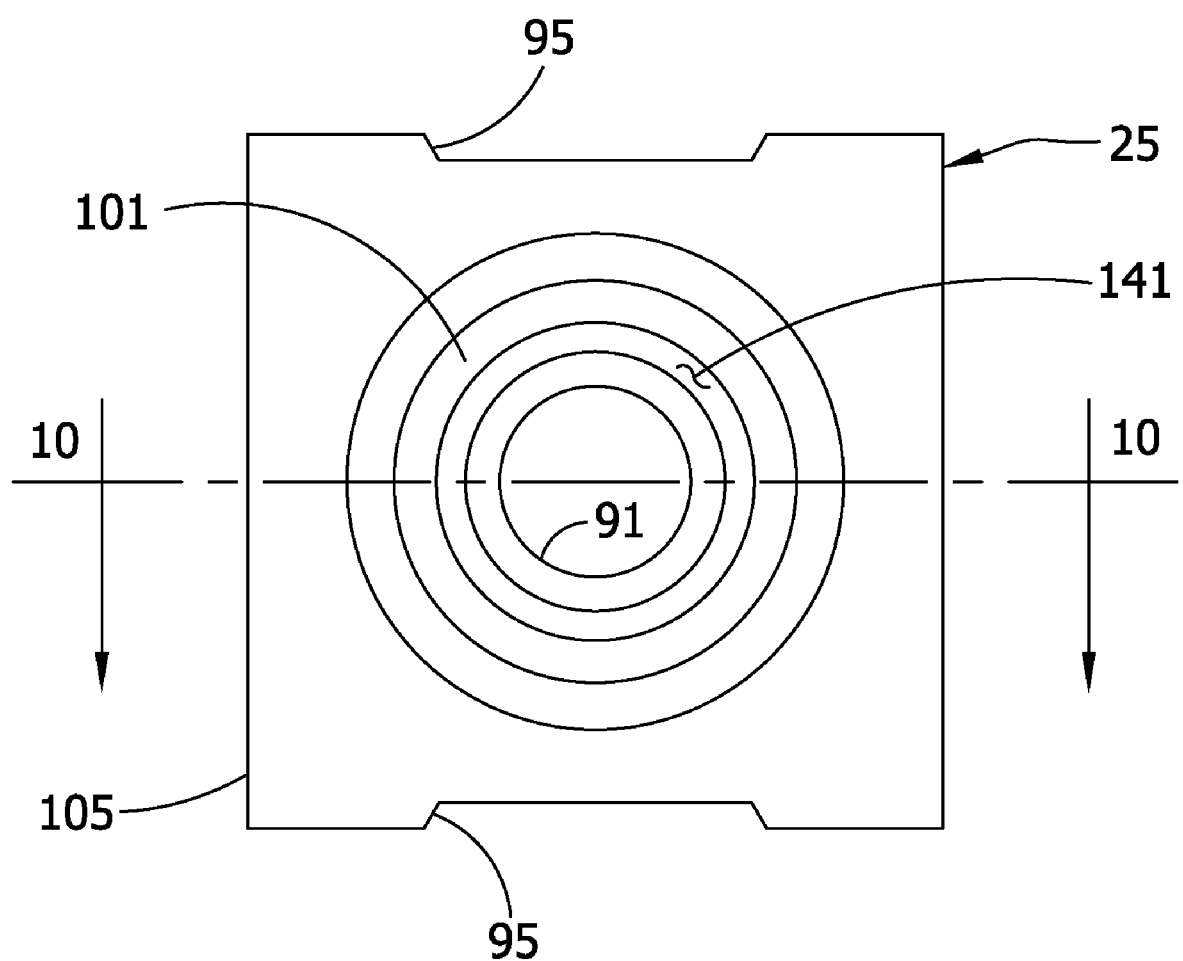
FIG. 9 is a bottom plan of a washer of the fastener assembly of FIG. 1.

The washer 25 is preferably generally rectangular in shape, and more preferably square in shape, although other shapes (e.g., polygonal, oval, circular) are possible. The washer 25 has an inside (lower) face 81 an outside (upper) face 83, a first pair of opposing sides 85 and a second pair of opposing sides 87. The distance D5 (FIG. 9) between the sides of at least one pair of opposing sides (e.g., the first pair of sides 85) is greater than the width W1 of the slot S in the framing 5 so that the washer 25 can span the slot with portions of the inside of the face 81 of the washer contacting the outside faces 11a, 11b of the framing 5 at opposite sides of the slot. The washer 25 has as unthreaded (clearance) opening 91 through it generally aligned with the threaded opening 71 in the body 21. The washer 25 has notches 95 in opposite sides thereof (e.g., 85 in FIG. 5) to facilitate gripping and turning of the washer during installation as will be described. Other gripping formations can be used.

Figure 4:
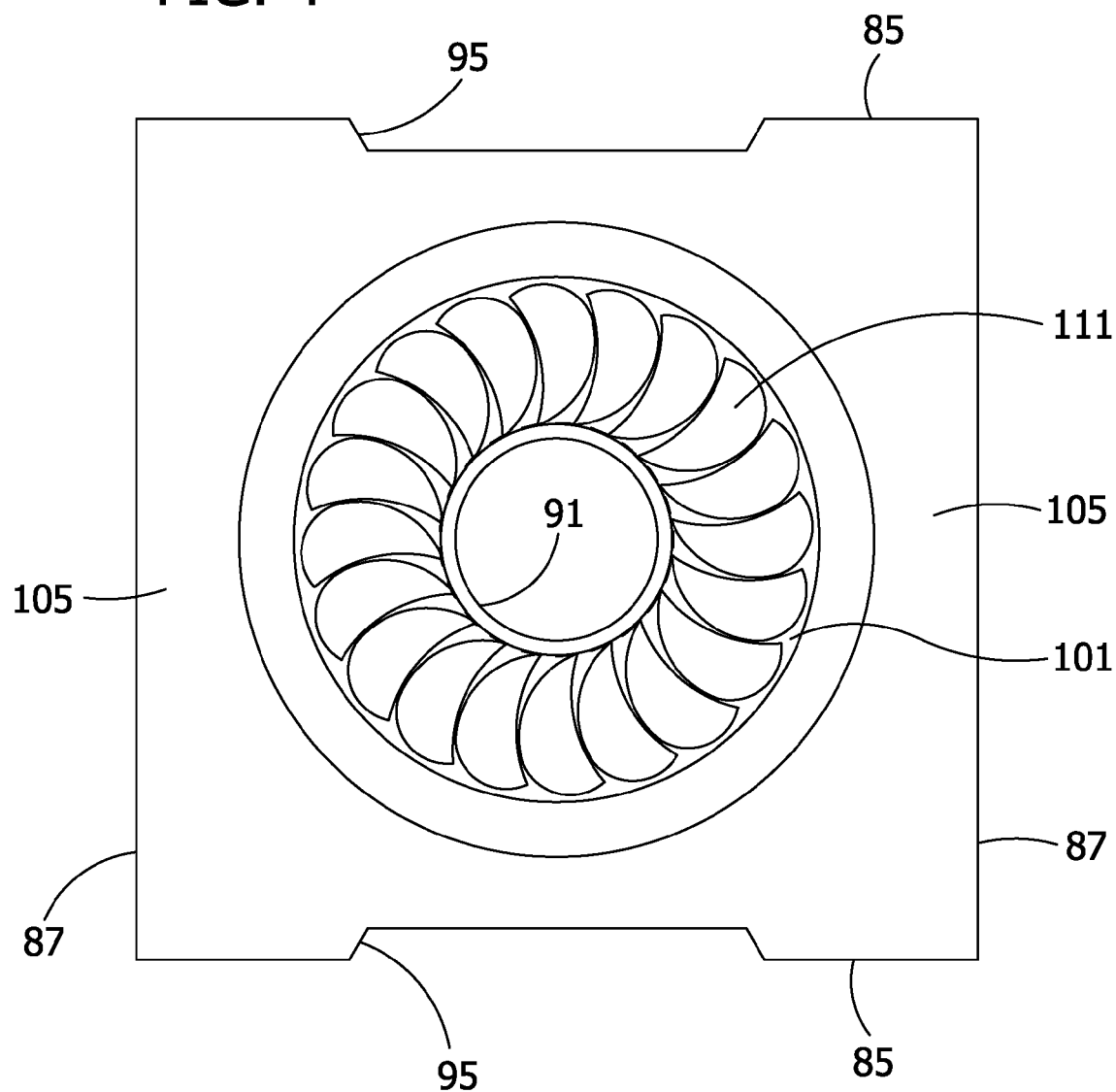
FIG. 4 is a top plan of the fastener assembly of FIG. 3.
Figure 10:
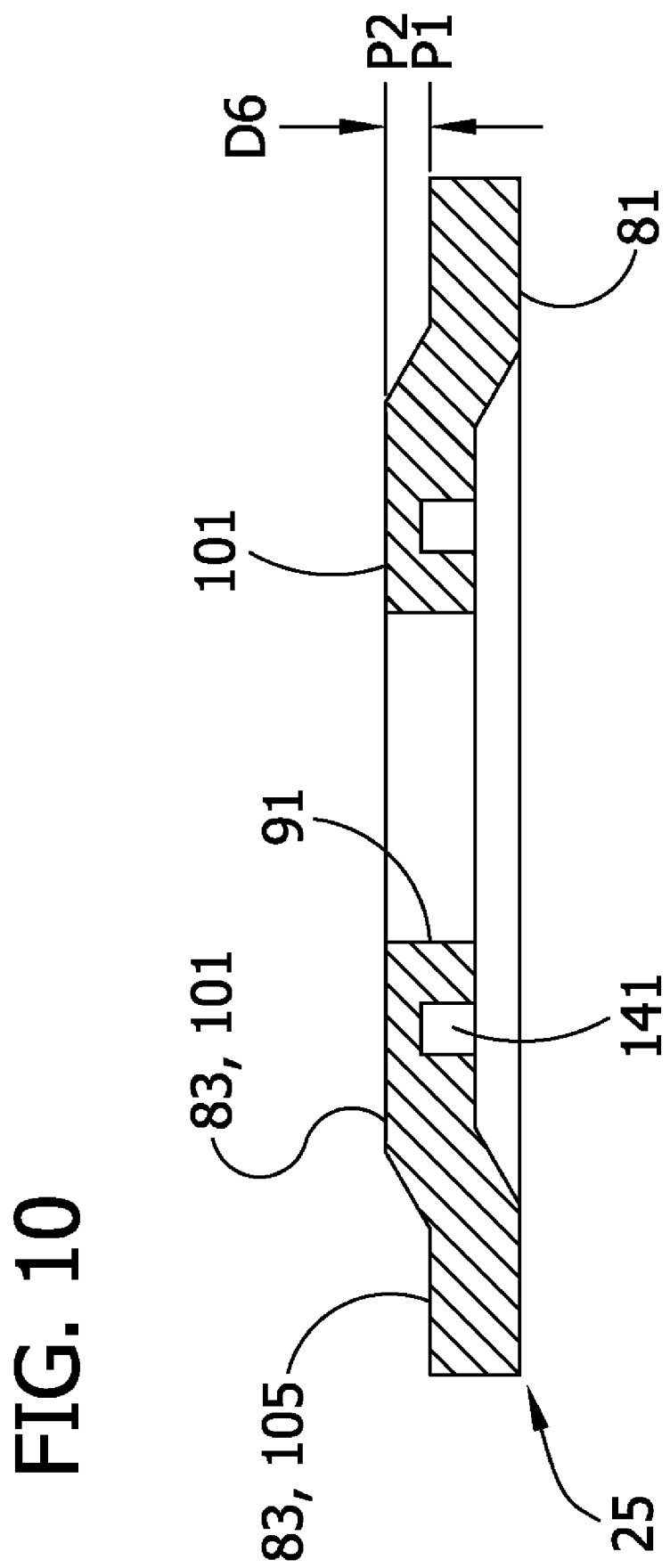
FIG. 10 is an enlarged section on line 10-10 of FIG. 9.

Referring to FIGS. 4 and 10, the washer 25 has a substantially flat central region 101 surrounding the opening 91 and a substantially flat peripheral region 105 surrounding the central region. To provide added structural strength to the washer 25, the central region 101 is upset or raised relative to the peripheral region 105. In particular, the peripheral region 105 lies substantially in a first plane (P1 in FIG. 10), and the central region 101 lies substantially in a second plane (P2) offset outward (i.e., in a direction away from the body 21) from the first plane P1 by a distance D6. The arrangement is such that when the washer 25 is positioned on the channel framing 5 (FIG. 1), the central region 101 of the washer projects outward away from the framing beyond the peripheral region 105 of the washer for contact by an object (e.g., 3) being secured to the framing. The generally planar central and peripheral regions 101, 105 are substantially parallel with the outside face 43 of the body 21, or at least the central region of the outside face of the body between the grooves 61.

Friction means is provided in the protruding central region 101 of the washer for inhibiting rotation of an object (e.g., object 3) secured to the framing, as will be described later. In one embodiment, this rotation-inhibiting means comprises a plurality of serrations 111 formed in the outside face 83 of the washer 25 around the opening 91 in the washer. Alternatively, the outside face 83 of the washer in the central region 101 may be roughened to provide ridges, projections or other protruding formations to inhibit such rotation. In effect, this roughening, by serrations or otherwise, enables the washer 25 to act as a lock washer without the use of a separate part (e.g., a conventional lock washer). The washer 25 may be formed by a stamping operation or other suitable operation. The washer 25 is preferably formed from metal, such as zinc-coated, ASTM A1018 steel or the equivalent. Other materials may be used.

As used herein, the term "washer" means any structural member (e.g., 23 in FIG. 1) adapted to bridge the slot S in the framing 5 and having portions adapted to contact opposite lips 9a, 9b of the framing, and further having an opening (e.g., 91) through it for receiving a fastener (e.g., 155 in FIG. 1) threaded into the body 21. The size and shape of the washer can vary as needed or desired.

Figure 11:
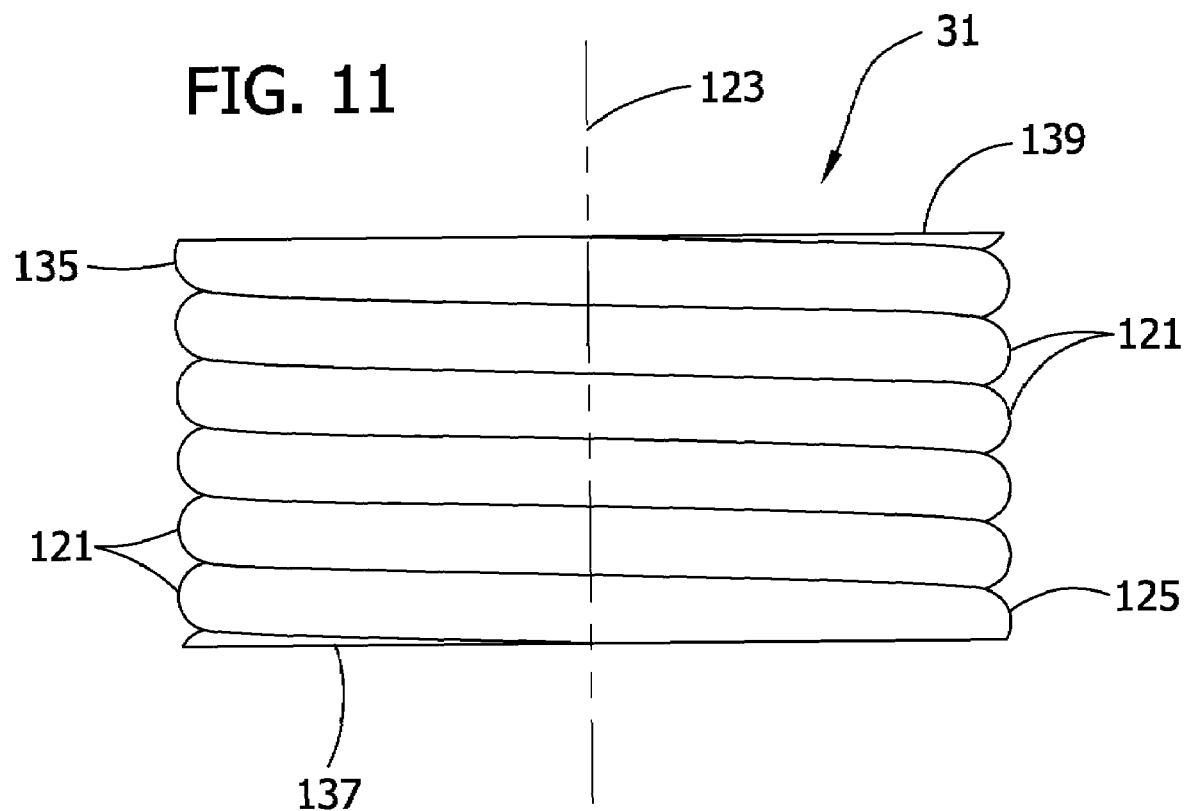
FIG. 11 is a side elevation of a spring of the fastener assembly of FIG. 1.

In the embodiment of FIG. 11, the resiliently deformable element 31 comprises a spring and, in particular, a coil extension spring having a plurality of winds 121 and a central longitudinal axis 123. In the illustrated embodiment, the spring 31 is a circular coil spring having circular winds, but it will be understood that the coil may have a shape other than circular (e.g., rectangular or square or oval). The spring 31 has a first (lower) end 125 received in an annular recess formed by an a circular groove 131 in the outside face 43 of the body 21 surrounding the threaded opening 71 in the body, and a second (upper) end 135 received in an annular recess formed by a circular groove 141 in the central region 101 of the inside face 81 of the washer surrounding the opening 91 in the washer. The first and second ends 125, 135 of the spring 31 have end faces 137 and 139, respectively, which are generally planar and generally perpendicular to the longitudinal axis 123 of the spring. When the spring 31 is assembled with the body 21 and washer 31, the openings 71, 91 in the body and washer are generally aligned (coincident) with the central longitudinal axis 123 of the spring, and the end faces 137, 139 of the spring are generally parallel to the opposing parallel faces 43, 81 of the body and washer. The spring ends 125, 135 are firmly (preferably immovably) fixed in respective grooves 131, 141 by suitable means, as by a staking operation, adhesive, welding, brazing, or other means. The spring 31 is of suitable wire, such as 1.25 mm wire formed from a zinc-coated ASTM 1566 metal alloy having a Rockwell hardness in the range of 45-50 C. Other materials may be used.

It will be apparent that the spring 31 can be affixed to the body 21 and washer 25 in other ways. For example, the lower end 125 of the coil spring 31 may have an extended portion firmly fixed (e.g., staked) in a linear groove in the outside 43 face of the body 21, or in a groove in one side 45 of the body (e.g., a linear groove extending from the outside face 43 to the inside face 41 of the body), or in a groove in the inside face 41 of the body. Further, the upper end of the spring 31 may have an extended portion firmly fixed (e.g., staked) in linear groove in the inside face 81 of the washer 25, or in a groove in the outside face 83 of the washer 25. Other configurations are possible.

The spring 31 allows relative movement between the body 21 and the washer 25 generally along the axis 123 of the spring. The spring 31 also provides a biasing force urging the body 21 and washer 31 toward one another. The length (height) of the coil spring 31 is such that when the spring is in a non-extended condition (FIG. 3) and the spacing between the body 21 and the washer 25 is at a minimum, the distance D7 between the inside face 81 of the washer 25 and the outside face 43 of the body 21 is less than the distance D8 (FIG. 2) between the inside and outside faces of the framing. As a result, the spring 31 must be extended to move the body 21 to the crosswise position shown in FIG. 1 during installation of the fastener assembly 1 on the framing. As explained in detail below, this extension of the spring 31 generates a force which clamps the washer 25 and body 21 against respective outside and inside faces 11*a*, 11*b*, 13*a*, 13*b* of the framing 5 to hold the assembly in the desired or selected position on the framing until an object (e.g., 3 in FIG. 1) is secured to the fastener assembly 1 using a threaded fastener of some type.

To install the fastener assembly 1 on the channel framing 5, the body 21 is aligned with, entered into and passed through slot S from the outside to the inside thereof until portions of the inside face 81 of the washer 25 adjacent opposite sides thereof contact (or nearly contact) the outside faces 11*a*, 11*b* of the channel lips 9*a*, 9*b* (see FIG. 2) on opposite sides of the slot S. Using the washer 25 as a handle, the fastener assembly 1 is then turned (rotated) in a first direction (e.g., clockwise as viewed in FIG. 1) to bring the ramps 55 on the inside face 43 of the body 21 into contact with the inside faces 13*a*, 13*b* of the channel lips 9*a*, 9*b*. Applying a further rotational force on the body 21 will cause the spring 31 to extend and the channel lips 9*a*, 9*b* to ride up respective ramps 55 on the body, thereby increasing the distance between the opposing faces 43, 81 of the body 21 and washer 25. Rotation of the body 21 is continued in the same direction through a quarter turn until the body extends crosswise relative to the slot S and the inside faces 13*a*, 13*b* of the channel lips 9*a*, 9*b* are received in the grooves 61 in the outside face 43 of the body. The rounded corners 49 of the body 21 facilitate rotation of the body to this crosswise position, further rotation being prevented by the unreduced (squared off) corners 51 which thus ensure proper alignment of toothed grooves 61 with the channel edges 13*a*, 13*b* and assist in holding the body against further turning. After the body 21 has been turned to this crosswise position, the washer 25 is released. The extended spring 31 exerts a force which urges the washer 25 and body 21 toward one another to bring portions of the outside face 43 of the body 21 into clamping engagement with the inside faces 13*a*, 13*b* of the channel lips 9*a*, 9*b* and portions of the inside face 81 of the washer 25 into clamping engagement with the outside faces 11*a*, 11*b* of the channel lips. The fastener assembly 1 may be quickly and easily removed from the framing (as for reuse) by simply reversing the steps as set out above.

After the assembly is installed on the framing, an object 3 (e.g., the bracket shown in phantom in FIG. 1) can be secured to the framing 5 by using a threaded fastener 155 (e.g., bolt or threaded rod, as shown in phantom in FIG. 1). The fastener 155, connected to the object 3, is simply inserted through the opening 91 in the washer 25 and threaded into the tapped opening 71 in the body 21. The body 21 is prevented from turning relative to the framing 5 by contact of the square (unreduced) corners of the body 21 with the sides 7*a*, 7*b* the channel framing. The threaded fastener 155 is tightened to bring a surface of the object 3 into frictional clamping engagement with the serrations 111 (or other rough formations) on the outside face 83 of the washer 25, and to bring the body and washer into an even more forceful clamping engagement with respective faces of the framing to secure the fastener assembly 1 and object 3 in the desired position along the channel.

Thus, it will be observed that the fastener assembly 1 of this invention is readily installed on a channel support and self-retaining thereon after installation. Moreover, since the body 21 and washer 25 are pre-assembled to form a single unit during the manufacturing process, the time required for installation process is shortened and more convenient. Further, the fastener assembly 1 may be used with channel framing of any depth and leaves the channel clear of obstructions for freely carrying conductors or the like.

Preferably, the coil spring 31 is assembled with the body 21 and washer 25 in an orientation such that rotation of the washer during installation of the fastener assembly 1 on the support 5 is in the same direction as the direction of the winds 121 of the coil.

The method of assembling the body 21, washer 25 and spring 31 is also relatively straightforward. The method comprises the steps of affixing the first end 125 of the coil spring 31 to the outside face 43 of the body, and affixing the opposite second end 135 of the spring to the inside face 81 of the washer such that the openings 71, 91 in the body and washer are generally aligned with one another and with the longitudinal axis 123 of the spring.

In another embodiment (not shown), the threaded opening 71 in the body 21 is eliminated and replaced by a threaded stud affixed (e.g., as by welding) to the outside face 43 of the body. The stud extends outward from the face 43 through the spring 31 and through the opening 91 in the washer 25. A nut is threaded on the stud to secure an object to the structure 5.

The resiliently deformable element 31 described above comprises a spring, and in one particular embodiment a coil extension spring. However, it is contemplated that other types of resiliently deformable elements or devices can be used to allow movement of the body 21 and washer 25 away from one another during installation of the fastener assembly on a structure (e.g., 5), while urging the body and washer toward one another to exert a clamping force to secure the assembly in position relative to a structure (e.g., 5).

In view of the above, it will be seen that the labor-saving objective of this invention is achieved and that other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fastener assembly for securing an object to a structure having a slot, the fastener assembly comprising:
   an elongate body having a first face constituting an inside face, an opposite face constituting an outside face, opposite sides, and opposite ends;
   a washer having a first face constituting an inside face opposing and spaced from the outside face of the elongate body, and a second face constituting an outside face;
   an opening through the washer; and
   a coil spring interposed between the elongate body and the washer, said spring having a longitudinal axis generally aligned with the opening in the washer, a first end affixed to the elongate body, and a second end affixed to the washer, said coil spring being axially extendable from a non-extended position to permit the elongate body and the washer to move away from one another generally along said axis, and said coil spring being operable when axially extended to urge the elongate body and washer to move toward one another generally along said axis;

said elongate body and washer being free of contact with one another when said spring is in said non-extended position.

2. A fastener assembly as set forth in claim 1 wherein said elongate body has diagonally opposite first and second corners, and a first ramp on the outside face of the elongate body adjacent the first corner of the body, said first ramp being adapted for engagement by said structure to facilitate movement of the elongate body away from the washer during said installation.

3. A fastener assembly as set forth in claim 2 further comprising a second ramp on the outside face of the elongate body adjacent the second corner of the body, said first ramp being adapted for engagement by said structure to facilitate movement of the elongate body away from the washer during said installation.

4. A fastener assembly as set forth in claim 3 wherein the first ramp slopes toward the first corner of the body and the second ramp slopes toward the second corner of the body.

5. A fastener assembly as set forth in claim 4 wherein said first and second corners of the body are rounded.

6. A fastener assembly as set forth in claim 1 wherein the first end of the spring is affixed to the outside face of the elongate body and the second end of the spring is affixed to the inside face of the washer.

7. A fastener assembly as set forth in claim 6 further comprising a first annular recess in the outside face of the elongate body for receiving the first end of the spring, and a second annular recess in the inside face of the washer surrounding said opening in the washer for receiving the second end of the spring.

8. A fastener assembly as set forth in claim 1 further comprising a threaded opening in said elongate body generally aligned with said spring axis.

9. A fastener assembly as set forth in claim 1 wherein the washer comprises a central region and a peripheral region surrounding the central region, the central region being raised relative to the peripheral region.

10. A fastener assembly as set forth in claim 9 further comprising friction means on the outside face of the washer in the central region thereof for inhibiting rotation of an object relative to the washer.

11. A fastener assembly as set forth in claim 10 wherein said friction means comprises serrations in the central region of the outside face of the washer.

12. A fastener assembly as set forth in claim 1 wherein the washer has a gripping formation thereon to facilitate turning of the washer to move the elongate body to said crosswise position.

13. A fastener assembly as set forth in claim 1 wherein the inside face of the washer is generally planar and is free of any structure that extends down to contact the elongate body when the coil spring is in its non-extended position.

14. A fastener assembly as set forth in claim 1 wherein the washer and elongate body are rotatable relative to one another about said longitudinal axis when the coil spring is in its non-extended position.

15. A fastener assembly as set forth in claim 1 wherein said washer is configured to function as a handle for securing the fastener assembly to said structure by holding the washer to align the length of the elongate body with the slot, to pass the body through the slot, and then, by turning the washer, to rotate the coil spring and elongate body about said longitudinal axis to a position in which the length of the elongate body extends crosswise relative to the slot and in which the inside face of the washer and the outside face of the elongate body are in clamping engagement with outside and inside faces of said structure, respectively.

16. A fastener assembly as set forth in claim 15 wherein said washer has an outside dimension extending lengthwise of the elongate body such that the washer extends in a radial direction beyond opposite ends of the elongate body.

17. A fastener assembly as set forth in claim 1 wherein said coil spring comprises circular winds having an outside diameter less than the width of said elongate body.

18. A fastener combination, comprising:

a structure having a slot, said slot having a width;

an elongate body having a first face constituting an inside face, an opposite face constituting an outside face, opposite sides, opposite ends, a length greater than the width of the slot and a width less than the width of the slot;

a washer having a first face constituting an inside face opposing and spaced from the outside face of the elongate body, a second face constituting an outside face, and an outside dimension extending lengthwise of the elongate body greater than the width of the slot;

an opening through the washer; and a coil spring interposed between the elongate body and the washer, said spring having a longitudinal axis generally aligned with the opening in the washer, a first end affixed to the elongate body, and a second end affixed to the washer, said coil spring being axially extendable from a non-extended position to permit the elongate body and the washer to move away from one another generally along said axis, and said coil spring being operable when axially extended to urge the elongate body and washer to move toward one another generally along said axis;

said washer being configured to function as a handle for securing the fastener assembly to said slotted structure by holding the washer to align the length of the elongate body with the slot, to pass the body through the slot, and then, by turning the washer, to rotate the coil spring and elongate body about said longitudinal axis to a position in which the length of the elongate body extends crosswise relative to the slot and in which the inside face of the washer and the outside face of the elongate body are in clamping engagement with outside and inside faces of said slotted structure, respectively.

19. A fastener assembly as set forth in claim 18 wherein said coil spring comprises circular winds having an outside diameter less than a width of said elongate body.

20. A fastener assembly as set forth in claim 18 wherein the washer has a gripping formation thereon to facilitate turning of the washer to move the elongate body to its crosswise position relative to the slot.

21. A fastener assembly as set forth in claim 18 wherein the inside face of the washer is generally planar and is free of any structure that extends down to contact the elongate body when the coil spring is in its non-extended position.

22. A fastener assembly as set forth in claim 18 wherein the washer and elongate body are rotatable relative to one another about said longitudinal axis when the coil spring is in its non-extended position.

* * * * *